United States Patent Office 3,272,599
Patented Sept. 13, 1966

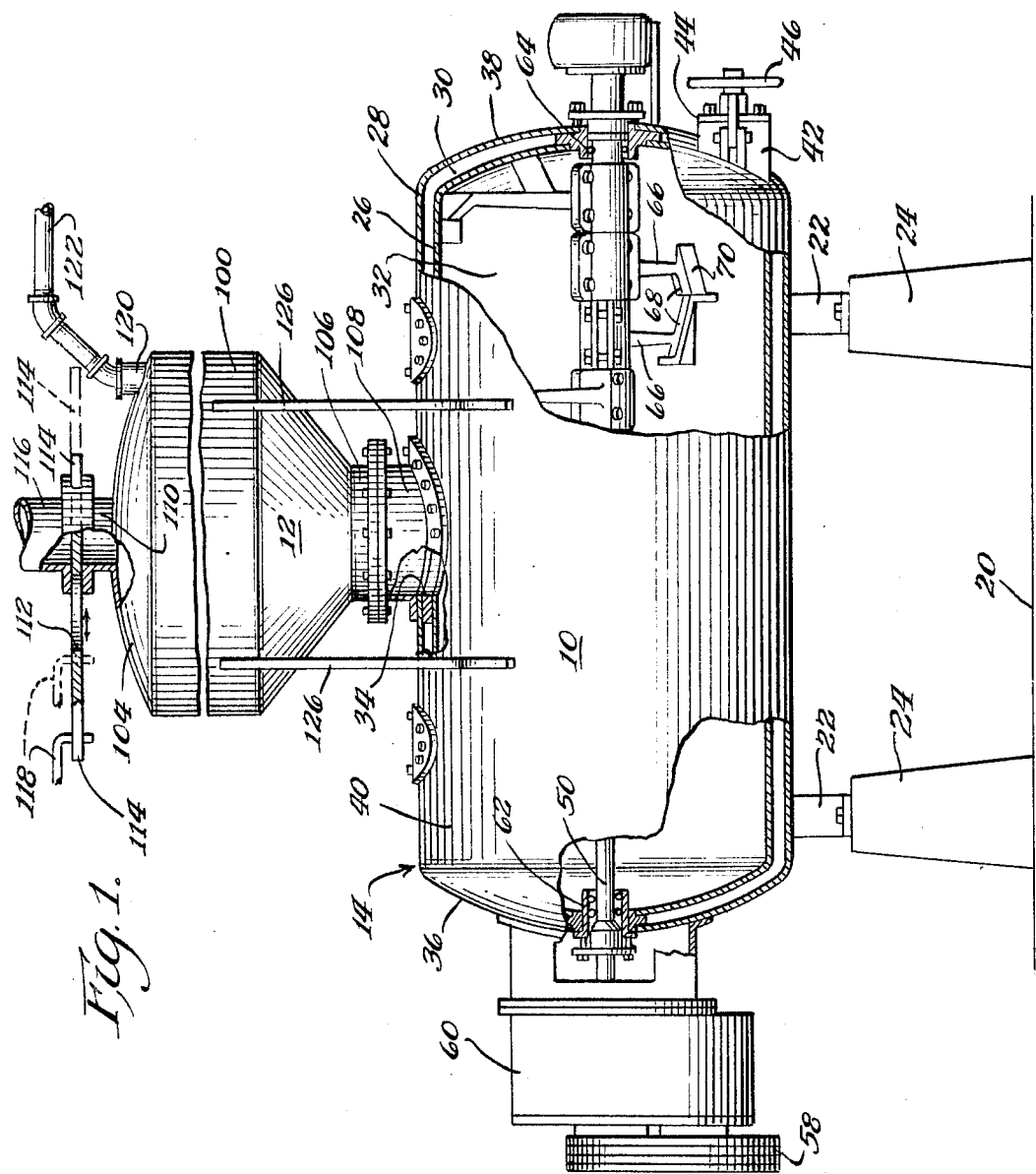

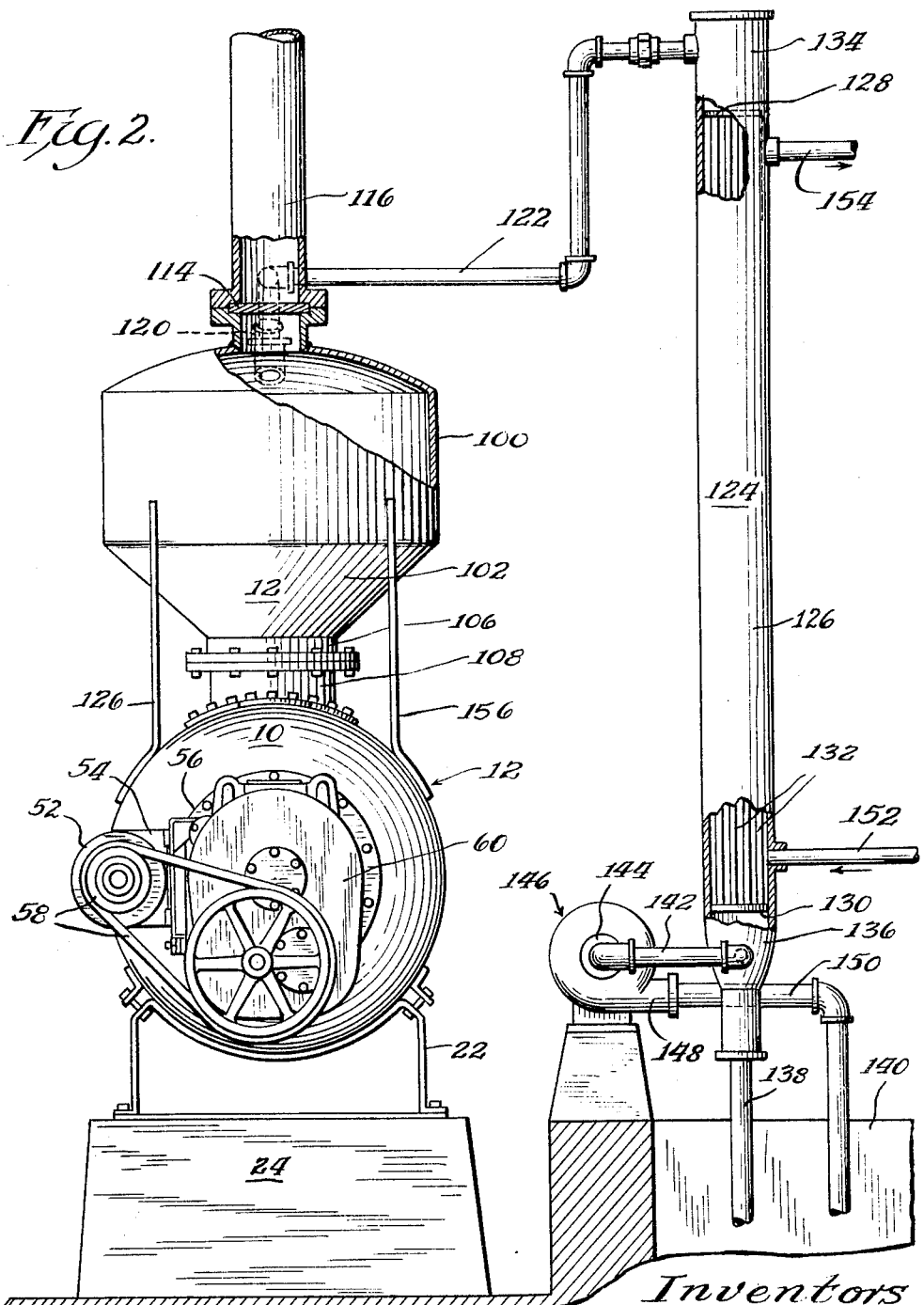

3,272,599
RENDERING COOKER WITH HYDROSTATIC CHARGING HEAD
Norman J. Allbright, Hinsdale, Ill., and Alvyn C. Boldon, % Faber Industries, 109 S. Monroe St., Peoria, Ill.; said Allbright assignor to said Boldon
Filed Nov. 5, 1962, Ser. No. 235,273
6 Claims. (Cl. 23—290.5)

The present invention relates generally to rendering apparatus and has particular reference to a cooker which is primarily designed for use in connection with the rendering of inedible animal products, such as butchers' bones and fats, fallen animals, poultry offal, hide trimmings, and the like. The invention is, however, capable of other uses and may, with or without modification, be employed for rendering edible animal products, such as various parts from freshly slaughtered carcasses. Irrespective of the particular use to which the present rendering cooker may be put, the essential features of the invention are at all times preserved.

In the rendering of animal products, regardless of whether inedible or edible, the principal function of any rendering cooker is to separate free fats from the other products in such a manner that the quality of the separated fats is retained or preserved. To attain this function, careful control of the rendering process in the cooker is necessary and the proper control can be attained only by constant attention to the cooker from the time each batch of material to be rendered is introduced into the cooker interior until the cooking or rendering has been completed. The driving-off of moisture is always a function of a rendering cooker and the amount of moisture which is driven off or released may vary approximately from ten percent to as high as seventy-five percent so that loss of moisture during the rendering process reduces the over-all volume or content of the batch of material being rendered in the cooker. By reason of the necessary relatively high temperature within the cooker and the length of cooking time, loss of moisture and resultant reduction in the volume of the batch of material being rendered in the cooker frequently lead to burning or scorching of the material in the cooker interior so that the rendered product, in the case of inedible products, is off color or otherwise injured, and in the case of edible products, is additionally subject to objectionable taste characteristics.

One type of rendering cooker which has gained widespread use is disclosed in and forms the subject matter of United States Patent No. 2,673,790, granted on Mar. 30, 1954 and entitled Rendering Cooker. Such a cooker consists essentially of a cylindrical, horizontally extending, steam-jacketed shell having a vertically extending charging dome on its upper central portion and a door-closed discharge opening at one end thereof; and in addition, an elongated, horizontally-disposed agitator shaft which is provided with paddles, extends longitudinally through the shell interior and is adapted to be driven in one direction by an electric motor and intermediate speed reducing gearing to effect agitation of the material being rendered. The agitator shaft of the cooker is further adapted after the cooking operation to be reversely driven in order that the paddles may effect discharge of the rendered or digested material through the discharge opening at the one end of the cooker shell. A cooker of this general character is possessed of certain limitations, one of which is a lack of heat transfer efficiency. Due to the driving-off of moisture during the rendering operation and the consequent progressive reduction in the volume or content of the material as the cooking operation progresses during the rendering of any given batch, the level of material in the cooker is gradually lowered so that near the end of the rendering process, the upper regions of the cooker are devoid of the material, and as a consequence, there is little or no heat transfer from the steam jacket through the cooker shell to the upper region of the shell interior. Stated otherwise, the upper region of the shell is not in contact with the material being rendered so that any heat transfer which does take place in this region of the cooker shell is one of convection from the steam into a gaseous media rather than one of conduction from the steam into a liquid media. This obviously results in an appreciable loss of efficiency, especially when loss of moisture has left the cooker less than half full as frequently occurs in connection with the rendering of certain types of materials or products. When a cooker is in operation and not completely full, the material being rendered invariably splashes up in the top or upper region of the shell under the influence of the agitating paddles and such splashed material as comes into contact with the top of the shell adheres to the shell and becomes burned or charred thus reducing the efficiency of the cooker for the next batch of material to be rendered, and also necessitating frequent and costly cleaning of the cooker.

The present invention is designed to overcome the above-noted limitation that is attendant upon the construction and use of a conventional rendering cooker, and toward this end, it contemplates the provision of a rendering coker having associated therewith in place of the conventional charging dome thereof, a combined charging head and flash tank which is of relatively large capacity, is positioned directly over the usual charging dome opening and is at all times in communication with the interior of the cooker shell through such opening. The combined charging head and flash tank is adapted to contain a quantity of the material undergoing rendering and the capacity of it is at least as great as the largest contemplated loss of moisture by volume from the cooker proper during the rendering of any given batch of material. Because of the fact that the combined charging head and flash tank is positioned directly above the usual charging dome opening and is in constant communication with the interior of the cooker shell through such opening, an hydrostatic head of the material being rendered is created immediately above the cooker shell interior and this hydrostatic head constitutes a reserve supply of the material so that as the moisture in the material within the cooker is driven off, the volume thereof will constantly be replaced with fresh material. Except for the addition of the combined charging head and flash tank and certain auxiliary equipment, the details of the cooker proper remain the same as those of a conventional cooker and, thus, during a normal rendering operation when the temperature of the material within the cooker is raised to a comparatively high degree, the moisture which is extracted or released from the material bubbles upwardly in the form of a gas which passes upwardly through the aforementioned hydrostatic head of material and collects in the upper region of the combined charging head and flash tank where it is subjected to a sub-atmospheric pressure in order to conduct it away from the cooker. The material to be rendered is charged into the cooker initially through the combined charging head and flash tank, and the latter is itself charged with material through a charging opening under control of a valve of the sliding gate type. A conveyor serves to bring the material to be rendered to the vicinity of the gate and then discharge it into the combined charging head and flash tank through the gate opening in the usual manner of charging a conventional cooker through its standard or conventional charging dome opening.

The rendering cooker of the present invention, as briefly outlined above, presents numerous advantages, principal among which is the fact that because the cooker is maintained in a full condition throughout the entire rendering period, maximum heat transfer area is offered at all times to the material in the cooker shell interior, thus resulting in a shorter cooking or rendering cycle by reason of the fact that no heat is wasted in heating gases and vapors in the upper region of the interior of the shell of the cooker. Furthermore, no inside bare shell areas are presented on which material may collect and become charred or burnt. Charring of the material being rendered in the cooker is, therefore, prevented. Because the cooker is completely full at the completion of the rendering operation or cycle for each batch, the amount of each batch of rendered material is appreciably increased, it being more than doubled in some instances, as, for example, where a moisture extraction of over 50% of the total batch of material to be rendered is anticipated. Because each rendered batch is of increased amount, fewer batch operations are required to handle a given quantity of the material or product to be rendered, or alternatively, fewer cookers are required to handle a given quantity of the material in a given length of time. Finally, depending upon the character of the material product undergoing rendering, the cooking time for each batch may be appreciably shortened, or where the duration of a rendering cycle remains the same, the quantity of material rendered is greater.

The provision of a rendering cooker possessing the heretofore mentioned advantages being the principal object of the invention, numerous other objects and advantages will readily suggest themselves as the nature of the invention is better understood.

In the accompanying two sheets of drawings forming a part of this specification, one illustrative embodiment of the invention has been shown.

In these drawings:

FIG. 1 is a side elevation of a rendering cooker embodying the principles of the present invention, certain parts of the cooker shell being broken away and other parts being shown in section in order more clearly to reveal the nature of the invention; and FIG. 20 is an end elevational view of the cooker, illustrating the design and arrangement of the auxiliary equipment which is employed in connection with the combined charging head and the flash tank of the cooker.

Referring now to the drawings in detail, the invention has been shown in connection with a cooker 10 of the general type which is illustrated and described in aforementioned United States Patent No. 2,673,790. The cooker 10, however, has been modified to adapt it to the principles of hydrostatic charging which constitutes the principal feature of the present invention. To thus adapt the cooker for hydrostatic charging thereof, the usual small-sized charging dome has been replaced by a combined charging head and flash tank 12. For convenience, such combined charging head and flash tank will hereafter be referred to as the head and tank assembly. The latter is supported on the top central portion of the cooker 10 and communicates with the interior of the cooker through the usual charging dome opening at the top of the cooker shell, all in a manner and for a purpose that will be made clear presently.

The structural details of the cooker 10 have not been fully illustrated in the drawings hereof inasmuch as they are substantially identical with the structural details of the cooker which is disclosed in aforementioned Patent No. 2,673,790, and reference may be had to such patent for a full understanding of these details. It is deemed sufficient for purposes of illustration herein to describe only the essential elements of the cooker 10 as they are pertinent to the present invention. The cooker 10 involves in its general organization a shell 14 which is of cylindrical configuration and has the axis thereof extending horizontally. The shell 14 is supported in an elevated position over the floor 20 of a rendering plant by means of cradles 22 on pedestals 24. It is of a composite nature and includes inner and outer shell sections 26 and 28 which define between them a steam jacket 30 for effecting high pressure cooking of the material to be rendered in the cooker. The inner shell section 26 defines a rendering chamber 32 for such material. During operation of the cooker, steam is circulated continuously through the steam jacket 30 by way of inlet and outlet openings (not shown) which communicate with suitable steam pipes leading from a source of steam such as a boiler (also not shown). The rendering chamber 32 is adapted to be completely filled with the material undergoing rendering at all times during the cooking operation and, accordingly, the shell 14 is provided at the top thereof with an inlet opening 34 for the material to be rendered. The outer shell section 28 comprises a dished front end wall 36, a dished rear end wall 38, and a cylindrical side wall 40, and the inner shell section 26 comprises similar walls. The opening 34 is preferably spaced midway between the dished front end walls 36 and 38 of the outer shell section and is located between and at the extreme top portions of the cylindrical side walls of the two shell sections. A tubular discharge nipple 42 extends through aligned holes in the lower portions of the dished rear end walls of the inner and outer shell sections 26 and 28 and defines a discharge opening by means of which the entire batch of rendered or digested material may be emptied into a crackling pan or the like (not shown) as is customary at the end or conclusion of operation of a commercial rendering cooker. A hinged door 44 in associated relation with the tubular discharge nipple 42 maintains the shell 14 in a closed condition while the material is being rendered or digested, and this door is adapted to be opened under the control of a hand wheel 46.

In order to agitate the material being rendered in the chamber 32 while the cooker is in operation, the cooker is provided with a horizontal agitator shaft 50 extending longitudinally through the central portion of the shell 14 and is adapted to be selectively driven in opposite directions by power mechanism including a reversible electric motor 52. The latter is mounted on a bracket 54 which, in turn, is supported on a mounting ring 56 on the front end wall 36 of the outer shell section 28. The motor 52 is operatively connected by way of a belt and pulley arrangement 58 and a gear reduction device 60 to the agitator shaft 50. The agitator shaft 50 is rotatably mounted in sealed bearings 62 and 64 at the ends of the shell 14 and is provided with the usual series of longitudinally spaced impeller paddles 66. The latter carry deflector blades 68 at their outer ends. The deflector blades 68 serve, during normal operation of the cooker, to agitate the material within the rendering chamber 32. The outer ends of the paddles have curved and angularly arranged deflector surfaces 70 which operate, when the shaft is reversely driven at the conclusion of a cooking rendering operation, to displace the rendered or digested material axially so as to force it through the discharge opening that is defined by the tubular discharge nipple 42.

The charging head and flash tank assembly 12 is disposed centrally above the cooker 10 and is in the form of a shell. The latter consists of a cylindrical side wall 100, a downwardly tapered, frusto-conical bottom wall 102, and an upwardly tapered frusto-conical top wall 104. The bottom wall 102 is provided with a short, depending, tubular, flanged extension 106 which communicates with a similar flanged extension 108. The last mentioned extension extends upwardly from the central upper portion of the cylindrical wall 40 of the outer section 28 of the shell 14, and, in turn, communicates with the rendering chamber 32 through the inlet opening 34. The frusto-conical top wall 104 of the head and tank assembly 12 is provided with an upwardly extending tubular flanged extension 110 which constitutes a charging stack for the assembly as a whole and communicates through a gate opening 112 in a sliding gate plate 114 with a vertical flanged charging pipe 116. The latter is adapted to receive the batch of material to be rendered from a suitable screw conveyor or other mechanical charging apparatus (not shown) and serves to conduct the material to the gate opening 112 when the gate plate 114 is in its open position. After passing through the opening 112 in the sliding gate plate, the material flows through the extension 110 into the head and tank assembly 12. The sliding gate plate 114 constitutes a valve for controlling the delivery of the material to be rendered. It extends across the upper end of the charging stack (extension 110) and is adapted to slide horizontally back and front between its open and closed positions by means of a control rod 118.

A relatively small diameter flanged extension 120 extends upwardly from the frusto-conical top wall 104 of the head and tank assembly 12 and is connected through a suitable flash line 122 to a condenser 124 (see FIG. 2).

The condenser 124 is of conventional design and no claim is made herein to any novelty in it. Considered as a whole, it constitutes a functional element of the present rendering system in that it serves to maintain the upper portion of the charging head and flash tank assembly 12 under sub-atmospheric pressure and thus effects withdrawal from the batch of material undergoing rendering of the gaseous constituents resulting from the rendering operation or process in the cooker 10. The majority of the gaseous constituents are steam or water vapor. The withdrawal of the gaseous constituents through the line 122 accounts for substantially all of the material shrinkage that takes place in the cooker 10 during the rendering operation. The condenser 124 comprises a vertically extending outer shell 126 of elongated cylindrical design. End plates 128 and 130 within the shell 126 serve to support therebetween condenser tubes 132. They also serve to establish upper and lower condenser heads 134 and 136. The upper head 134 is operatively connected through the line 122 to the flanged extension 120, while the lower head 136 is connected through a drain line 138 to a suitable region of discharge, as, for example, a sump, a fragment of which is shown at 140. The lower head 136 also is connected through a line 142 to the intake side 144 of a motor-driven suction pump 146, the discharge side 148 of the pump being connected through a line 150 to the discharge region or sump 140. Cooling water is fed to the condenser 124 through a line 152 which communicates with the space in the shell 126 that surrounds the tubes 132. The discharge end of the line 152 enters the shell near the bottom thereof as shown in FIG. 2. The cooling water, after it has assimilated heat from the gases and vapors passing downwardly through the condenser tubes 132 from the head 134 to the head 136, is carried away in a heated condition through a discharge line 154 which communicates with the interior of the shell 126 near the top thereof. The lines 152 and 154 may be operatively connected to a cooling tower (not shown) in the usual manner of condenser operation to establish a continuous flow water cooling circuit for the condenser 124.

The head and tank assembly 12 is supported above the cooker 10 by way of vertically extending struts 156 the upper ends of which are connected to the assembly 12 and the lower ends of which are connected to the upper portion of the shell 14 of the cooker.

The cooker 10 is designed essentially for batch operation. In order to charge the cooker initially, the gate plate 114, which preferably is pneumatically operated by mechanism not shown, is slid horizontally from its full-line position in FIG. 1 to its dotted-line position wherein the gate opening 112 registers with both the charging stack forming extension 110 and the charging pipe 116 to the end that the material that is fed from the aforementioned overhead screw conveyor or other charging apparatus or instrumentality enters the head and tank assembly 12 through the extension 110. The charging operation is continued until the rendering chamber 32 within the cooker shell 14 is completely filled and the assembly is filled at least to the extent which it is calculated will be required for material replacement purposes during batch operation of the cooker. For example, if the capacity of the cooker 10 is forty-five hundred pounds and the character of the material product undergoing rendering is such that there will be an expected loss of two thousand pounds due to moisture evaporation or removal, the charging operation will be continued until the amount of at least two thousand pounds of the material remains in the charging head and flash tank assembly 12 as an hydrostatic head of liquid extending upwardly through the discharge opening 34 from the cooker chamber 32. Preferably, however, an amount of material considerably in excess of the estimated loss by evaporation will be introduced into the assembly 12 after the cooker is full and satisfactory operation will ordinarily be attained by completely filling the assembly 12 regardless of the estimated loss of material from the chamber 32 by evaporation. After the required amount of material to be rendered has been admitted to the cooker 10 and the head and tank assembly 12 through the gate opening 112, the gate plate 114 will be slid to its closed or cut-off position where communication between the pipe 116 and extension 110 is discontinued and the upward end of the assembly 12 is sealed except for its communication with the flash line 122. Thereafter, the cooker 10 is set into operation in the usual manner by admitting steam to the steam jacket 30 and causing the agitator shaft 50 to be rotated under the influence of the electric driving motor 52. During the cooking operation, due to the high heat which is imparted to the material within the chamber 32, the temperature of the material will be raised considerably above the flash point of the moisture contained therein and this moisture will escape in the form of gas bubbles upwardly through the charging opening 34 and through the material in the charging head and flash tank assembly 12 where it will collect in the upper portion of the assembly and be flashed away under the influence of the sub-atmospheric pressure which is maintained in the line 122 by the condenser 124 and the suction pump 146. As moisture continues to be thus extracted from the material within the rendering chamber 32, the lost volume is replaced by the hydrostatic head of material which extends upwardly from the chamber through the opening 34 and into the assembly 12. The level of material in the assembly is gradually lowered but because of the fact that the volume of the material originally introduced into the shell of the assembly 12 is greater than any anticipated loss by moisture evaporation or removal, at the time that the cooking operation or cycle is completed, the cooker 10 will remain full.

The material which is contained in the charging head and flash tank assembly and gradually diminishes as the cooking operation ensues does not remain in its raw state since an appreciable amount of heat is assimilated thereby by heat transfer upwardly through the material and into the assembly, especially since there will be considerable ebullition of gases from the interior of the cooker into the interior of the assembly. These hot gases will heat the material within the assembly 12 substantially to the temperature of the material within the cooker and thus the space within the charging head constitutes an extension of the chamber 32 in the shell 14. As the result of the agitating effect of the shaft 20, there will be a constant intermixing of the materials in the chamber 32 and the material in the shell of the assembly 12.

When the necessary cooking time has elapsed and the material in the chamber 32 of the shell 14 has been thoroughly digested, the door 44 will be opened, while at the same time, the direction of rotation of the agitator shaft 50 will be reversed so that the rendered or digested material will be horizontally displaced and forced thorugh the discharge nipple 42 for subsequent separation of the grease and cracklings in the usual manner of rendering. Any excess material which may remain in the charging head and flash tank assembly 12 at the time the rendering operation is complete and immediately before the door 44 is opened will, after the door has been opened, flow into the cooker chamber 34 and then be discharged with the rest of the material from the chamber. However, since this excess material has been thoroughly digested along with the material in the chamber 32, as previously outlined, the presence of excess material in the assembly 12 at the time that the cooker is emptied will not affect the character of the rendered product.

It is to be noted at this point that because of the fact that the chamber 32 within the shell 14 remains completely full during the entire rendering period, heat transfer from the steam jacket 30 to the material in the chamber 32 takes place throughout the entire heat exchange surface area of the walls of the inner shell section 26 thereby contributing toward a shorter rendering time. Additionally, since there is no possibility of the formation of a gas pocket in the upper portion of the chamber 32, as is the case in connection with a conventional rendering cooker, there will be within the cooker no super-heated bare walls against which the material may splash and become charred or burned.

Considering now the fact that a certain type of product such as poultry offal requires a longer cooking time than another given product, for example, butcher bones, scrap bones and the like, the process involved may be regulated in a predetermined fashion to yield either a greater product or a shorter cooking time than would be possible with a conventional cooker, and in the absence of the combined charging head and flash tank of the present invention. Although the rendering of poultry offal may require as much as twenty-five percent longer cooking time, a considerably greater material or product volume may be rendered in any given batch due to the volume of material in the hydrostatic head that is maintained by the combined charging head and flash tank 12. In the case of butcher bones and the like, due to the fact that the cooker remains full at all times, the greater amount of heat which enters the material or product through the heat transfer areas of the shell 14 leads to a shorter cooking time than ordinarily is the case in the absence of the assembly 12. For any given product, therefore, the cooking process may be regulated at will to attain either a shorter cooking time or a greater amount of product than is possible with a conventional cooker which does not have the combined charging head and flash tank of the present invention.

The invention is not to be limited to the exact arrangement of parts shown in the accompanying drawings or described in this specification as various changes in the details of construction may be resorted to without departing from the spirit or scope of the invention. Therefore, only insofar as the invention has been particularly pointed out in the accompanying claims is the same to be limited.

Having thus described the invention what we claim as new and desire to secure by Letters Patent is:

1. A rendering cooker designed for the batch rendering of moisture-containing animal matter by evaporation of moisture therefrom and comprising a cooker shell defining an internal rendering chamber and provided with a discharge opening in the lower portion thereof and an inlet opening in its upper portion, a door associated with said discharge opening and movable between open and closed positions, a steam jacket substantially surrounding said shell and in direct heat transfer relationship therewith, a combined charging head and flash tank positioned above said cooker shell and defining an internal charging chamber, said charging chamber being continuously in communication with said rendering chamber through said inlet opening, the volumetric capacity of said internal charging chamber being at least equal to the volume of moisture to be extracted from the animal material in the rendering chamber when the latter is full, said combined charging head and flash tank being provided with a charging opening and a moisture outlet opening in the upper portion thereof, a closure member associated with said charging opening and movable between open and closed positions, said charging chamber being adapted, when the rendering chamber is completely filled with material to be rendered, to retain a reserve quantity of the material in the form of an hydrostatic head of the material for gravity flow into the rendering chamber during extraction of moisture from the material in the rendering chamber, said moisture outlet being provided with means whereby it may be operatively connected to a source of sub-atmospheric pressure, and means for agitating the material within said rendering chamber.

2. A rendering cooker as set forth in claim 1 and wherein the closure member for the charging opening is in the form of a horizontally slidable gate movable between a closed position wherein it completely covers said charging opening and an open position wherein it uncovers said charging opening.

3. A rendering cooker designed for the batch rendering of moisture-containing animal matter by evaporation of moisture therefrom and comprising a horizontally elongated and generally cylindrical composite cooker shell including inner and outer spaced shell sections defining a steam jacket therebetween, said inner shell section defining an internal rendering chamber, said shell being provided with a discharge opening for rendered material in the lower region thereof and with an inlet opening for the material to be rendered at the extreme top thereof, a combined charging head and flash tank positioned directly above said inlet opening, said combined charging head and flash tank being provided with a frustoconical, funnel-like bottom wall, an upstanding side wall, and a top wall, the volumetric capacity of said internal charging chamber being at least equal to the volume of moisture to be extracted from the animal matter in the rendering chamber when the latter is full, said walls defining an internal charging chamber, said bottom wall being provided with an opening therein in direct communication with the inlet opening of the cooker shell, said top wall being provided with a charging opening and a moisture outlet opening, a closure member associated with said charging opening and movable between open and closed positions, said moisture outlet opening being provided for connecting it to a source of sub-atmospheric pressure, said charging chamber being adapted, when the rendering chamber is completely filled with material to be rendered, to retain a reserve quantity of the material in the form of an hydrostatic head of the material for gravity flow into the rendering chamber, and means for agitating the material within said rendering chamber.

4. A rendering cooker as set forth in claim 3 and wherein the closure member for the charging opening is in the form of a horizontally slidable gate movable between a closed position wherein it completely covers said charging opening and an open position wherein it uncovers said charging opening.

5. In a system for the batch rendering of a predetermined quantity of moisture-containing animal matter by evaporation of moisture therefrom, in combination, a rendering cooker including a cooker shell defining an internal rendering chamber and provided with a discharge opening in the lower region thereof and an inlet opening in its upper region, a door associated with said discharge opening and movable back and forth between open and closed positions, a steam jacket surrounding said shell and in direct heat transfer relationship therewith, and a combined charging head and flash tank positioned above said shell and defining an internal charging chamber, the volumetric capacity of said internal charging chamber being at least equal to the volume of moisture to be extracted from the animal material in the rendering chamber when the latter is full, said charging chamber being in continuous communication with said rendering chamber through said inlet opening, said combined charging head and flash tank being provided with a charging opening, and a moisture outlet opening in the upper region thereof, a closure member associated with said charging opening and movable between open and closed positions, said charging chamber being adapted, when the rendering chamber is completely filled with material to be rendered, to retain a reserve quantity of the material in the form of an hydrostatic head of the material for gravity flow into the rendering chamber during extraction of moisture from the material in the rendering chamber, and a gas and vapor condenser operatively connected to said moisture outlet opening.

6. In a batch rendering system, the combination set forth in claim 5 and wherein the gas and vapor condenser is provided with a condensate outlet, the system including, additionally, a suction pump having its intake side operatively connected to said condensate outlet.

References Cited by the Examiner
UNITED STATES PATENTS

| | | | |
|---|---|---|---|
| 994,047 | 5/1911 | Wiselogel | 23—259.3 |
| 1,695,254 | 12/1928 | McTavish | 23—280 |
| 1,854,270 | 4/1932 | McGilton | 260—412.6 |
| 2,467,529 | 4/1949 | Hormel | 260—412.6 |
| 2,551,034 | 5/1951 | Merriman et al. | 23—280 |
| 2,673,790 | 3/1954 | Illsley | 23—280 |

MORRIS O. WOLK, *Primary Examiner.*

CHARLES B. PARKER, JAMES H. TAYMAN, Jr.,
*Examiners.*

A. H. SUTTO, *Assistant Examiner.*